United States Patent [19]

Stewart et al.

[11] 4,344,568

[45] Aug. 17, 1982

[54] CLOSED-LOOP HEAT-RECLAIMING SYSTEM

[76] Inventors: Owen E. Stewart, R.R. #1, Cambridge City, Ind. 47327; Carl W. Stewart, P.O. Box 317, Dublin, Ind. 47335

[21] Appl. No.: 128,661

[22] Filed: Mar. 10, 1980

[51] Int. Cl.³ .............................................. F24D 3/00
[52] U.S. Cl. .................................... 237/8 R; 165/40; 165/76; 165/DIG. 12; 122/20 B
[58] Field of Search .................. 165/DIG. 2, DIG. 12, 165/39, 76, 40; 122/20 B; 237/8 R, 19, 55, 56, 8 A

[56] References Cited

U.S. PATENT DOCUMENTS

| | | | |
|---|---|---|---|
| 1,706,036 | 3/1929 | Nelsson | 122/20 B |
| 1,896,671 | 2/1933 | Heaps | 122/20 B |
| 2,199,183 | 4/1940 | Lippincott et al. | 122/20 B |
| 3,896,992 | 7/1975 | Borovina et al. | 237/19 |
| 3,916,991 | 11/1975 | Trump | 122/20 B X |
| 4,037,567 | 7/1977 | Torres | 122/20 B |
| 4,066,210 | 1/1978 | Pemberton et al. | 122/20 B X |
| 4,090,474 | 5/1978 | Kauffmann | 122/20 B |
| 4,122,801 | 10/1978 | Burns | 122/20 B |
| 4,136,731 | 1/1979 | DeBoer | 122/20 B |
| 4,175,518 | 11/1979 | Reames | 122/20 B |
| 4,215,741 | 8/1980 | Averbuch et al. | 122/20 B |
| 4,251,028 | 2/1981 | Nicolai et al. | 122/20 B |

FOREIGN PATENT DOCUMENTS 759808 2/1934 France ........................ 122/20 B

Primary Examiner—Albert W. Davis
Assistant Examiner—Margaret A. Focarino
Attorney, Agent, or Firm—Jenkins, Coffey, Hyland, Badger & Conard

[57] ABSTRACT

A closed-loop heat-transfer system includes in combination an exhaust chamber for positioning in series with a chimney flue of a heating system wherein the exhaust chamber has an exhaust inlet and an exhaust outlet opening adapted for connecting the chamber to the chimney flue. The exhaust chamber includes a first heat exchanger having a fluid inlet opening and a fluid outlet opening and a coiled conduit positioned interior to the chamber interconnecting the fluid inlet and outlet openings. The heat-transfer system also includes a second heat exchanger for positioning in a location remote to the chimney flue, and the second heat exchanger also has a fluid inlet opening and a fluid outlet opening. A conduit couples the fluid openings of the first heat exchanger to the fluid openings of the second heat exchanger to form a closed circulatory loop for a heat-transferring fluid. The closed fluid circulatory loop includes a pump for circulating the fluid therethrough and a temperature-actuated control responsive to the fluid temperature. In one embodiment, the pump and temperature-actuated control are mounted to the exterior of the exhaust chamber to form an integrated heat-transfer assembly which is easily installed in the chimney flue of the heating system.

9 Claims, 4 Drawing Figures

CLOSED-LOOP HEAT-RECLAIMING SYSTEM

The present invention relates generally to heat-transfer systems for reclaiming heat lost through the chimney flue of most heating equipment. More particularly, the present invention relates to a closed-loop heat-transfer system which is completely self-contained, is easy to install, and includes a fluid-control system having various safety features.

Because it is well recognized that most heating equipment is quite inefficient in its operation, various heat-reclaiming systems have been proposed wherein heat exchangers have been positioned in the chimney flue of the heating system and a fluid circulated through the heat exchanger and either returned to a hot water tank for supplementing its heating of hot water, to a hot water radiator for providing supplemental heat, or to the cold air plenum of the heating equipment to preheat the air heated by the heating system. In particular, U.S. Pat. Nos. 1,896,671; 2,074,989; 2,481,480; 3,896,992; 4,037,567; 4,090,474; 5,122,801; and 4,136,731 are representative of some of these proposed prior art heat-transfer apparatus and reclaiming systems.

Of those prior art systems disclosed in the aforementioned U.S. patents, the systems disclosed in U.S. Pat. Nos. 3,896,992 and 4,136,731 are believed to be most pertinent to the present invention. Each of the heat-reclaiming systems disclosed in these two U.S. patents are primarily concerned with supplementing the heating of hot water in a hot water tank. However, U.S. Pat. No. 4,136,731 also discloses a circulatory loop which includes a heat exchanger provided in the cold air plenum of the heating equipment to preheat the cold air being returned through the heating system.

One problem associated with these prior heat-reclaiming systems is the fact that they all use an external fluid supply source which is typically the water supply for the building being heated. Accordingly, the systems are not completely self-contained, but must rely upon the supply of fluid from an external source which in many cases is supplied to the heat-reclaiming system under substantial pressure. A further problem associated with these prior heat-reclaiming systems is the lack of safety features to prevent overheating and expansion of the fluid within the system. Accordingly, these prior systems can supply too much heat and/or develop high-pressure conditions. These prior systems are also complex to install and provide no means for servicing and maintaining the heat exchanger positioned within the chimney flue of the heating system.

It is therefore one object of the present invention to provide a heat-transfer apparatus adapted to be positioned in series with a chimney flue which includes an exhaust chamber having means allowing access to the interior of the chamber for cleaning and servicing a heat exchanger contained therein.

It is a further object of the present invention to provide a heat-transfer assembly adapted for installation in series with a chimney flue of a heating system and a closed-loop heat-reclaiming system including the heat-transfer assembly which is easily installed and easily maintained and serviced.

According to the present invention, the heat-transfer assembly includes in combination a heat-exchanger chamber having a cross-sectional dimension greater than the cross-sectional dimension of the chimney flue wherein the chamber includes reduced ends for connecting the chamber in series with two sections of the chimney flue, a fluid inlet opening, a fluid outlet opening, a coiled conduit positioned interior to the chamber having one end connected to the fluid inlet opening and another end connected to the fluid outlet opening, and a fluid control system mounted to the exterior of the chamber, thereby providing an integrated heat-transfer unit which is easily installed within the chimney flue of a heating system.

A closed-loop heat-transfer system according to the present invention includes in combination an exhaust chamber for positioning in series with a chimney flue of a heating system, the exhaust chamber having exhaust inlet and outlet openings adapted for connecting to the chimney flue, the exhaust chamber including a first heat exchanger having a fluid inlet opening and a fluid outlet opening, a second heat exchanger for positioning in a location remote to the chimney flue, the second heat exchanger having a fluid inlet opening and a fluid outlet opening, conduit means for coupling the fluid openings of the first heat exchanger to the fluid openings of the second heat exchanger to form a closed circulatory loop for a heat-transferring fluid, the closed fluid circulatory loop including means for circulating the fluid therethrough and a temperature-actuated control responsive to the fluid temperature, means electrically interconnecting the temperature-actuated control and the circulating means, the temperature-actuated control being activated to activate the circulating means when the fluid temperature exceeds a first predetermined temperature, and means electrically interconnecting the temperature-actuated control and the heating system, the temperature-actuated control also being activated to at least partially de-energize the heating system when the fluid temperature exceeds a second predetermined temperature.

As a further feature, a closed-loop heat-transfer system according to the present invention also includes means for connecting the chimney flue on the exhaust inlet side of the exhaust chamber to the chimney flue on the exhaust outlet side of the exhaust chamber and means for controlling the flow path of the heated exhaust in the chimney flue through either the first heat exchanger or the connecting means. Furthermore, means electrically interconnecting the flow path control means and the temperature-actuated control conrols the flow path of the heated exhaust in the chimney flue in response to fluid temperature. The flow path of the heated exhaust in the chimney flue is normally through the first heat exchanger to heat the fluid and the flow path is directed through the connecting means to the exclusion of the first heat exchanger when the temperature of the fluid exceeds a predetermined temperature.

According to the present invention, it is a further object to provide a fluid control system in a heat-reclaiming system which includes safety features for de-energizing the heat source of the heating equipment when the temperature of the fluid within the closed loop exceeds a predetermined temperature to prevent excessive pressure within the heat-reclaiming system. Furthermore, means for bypassing the first heat exchanger permits the quantity of heat being transferred by the heat-reclaiming system to be controlled.

Various other features and advantages associated with the present invention will become apparent in view of the following detailed description of an embodiment thereof, which description should be considered in conjunction with the following drawings, in which.

Figure 3:
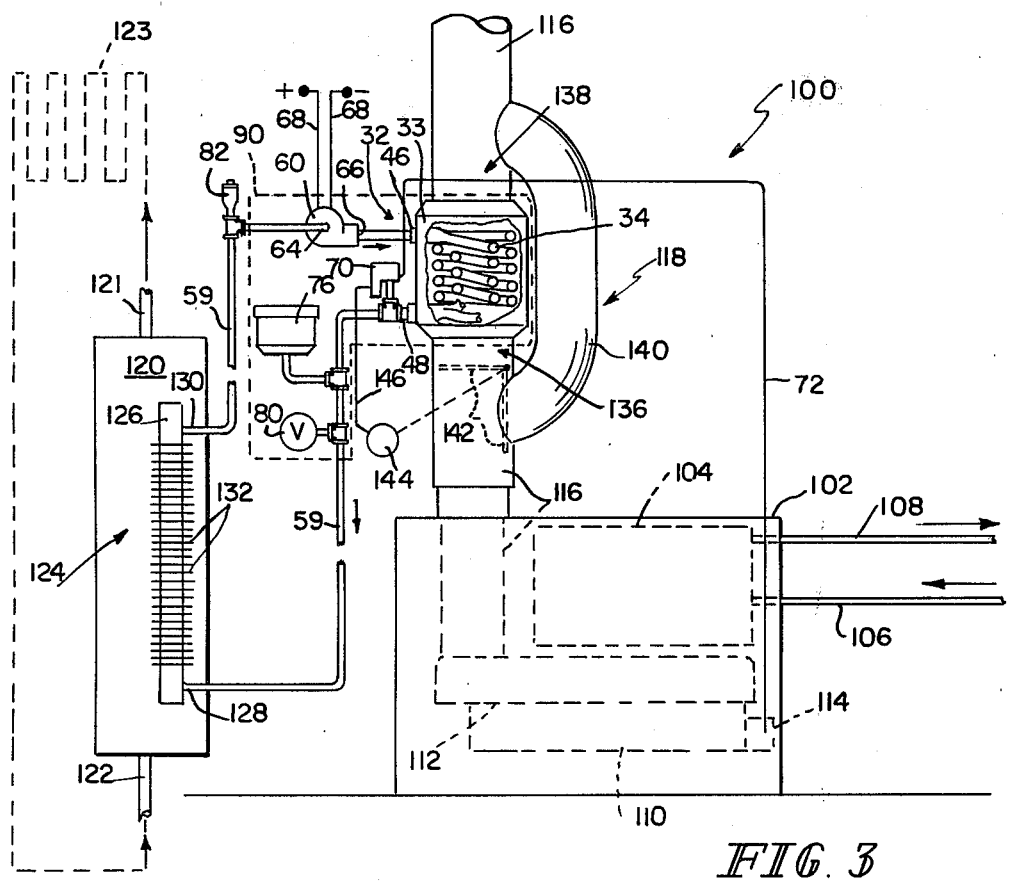
Figure 4:
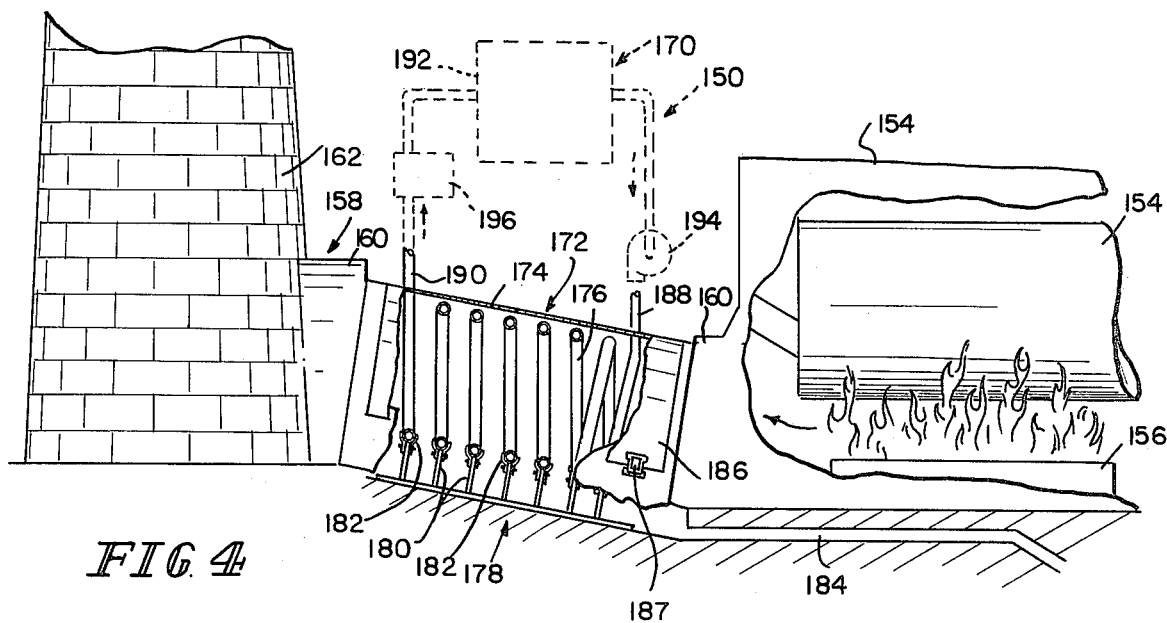

FIG. 3 is a partly sectioned diagrammatic view of a closed-loop heat-reclaiming system according to the present invention shown adapted to a forced-steam heating system and further illustrating a feature associated with the present invention; and FIG. 4 is a partly sectioned diagrammatic view of a further type of heating system illustrating the adaptation of the closed-loop heat-reclaiming system of the present invention thereto.

A significant percentage of the heat generated by most heating systems is lost through the escape of heated exhaust through the chimney flue associated with these systems. While various apparatus and systems have been developed to try to capture some of the lost heat associated with the heat exhaust, the commercialization of these prior systems as supplementary heating sources has not been successful because of what appears to be a lack of safety features and an inability to control the quantity of heat transferred from the chimney flue to a remote location. For example, one necessary safety feature should include means for preventing excessive pressure in the heat-reclaiming system. Furthermore, when the heat-reclaiming system is used as a supplemental heating source to heat a room, or hot water tank, it is necessary to control the quantity of heat transferred so that the room and/or hot water does not become too hot. The closed-loop heat-reclaiming system according to the present invention is designed and improved to include the necessary safety features and further to include means for controlling the quantity of heat transferred from the chimney flue to a remote location.

Figure 1:
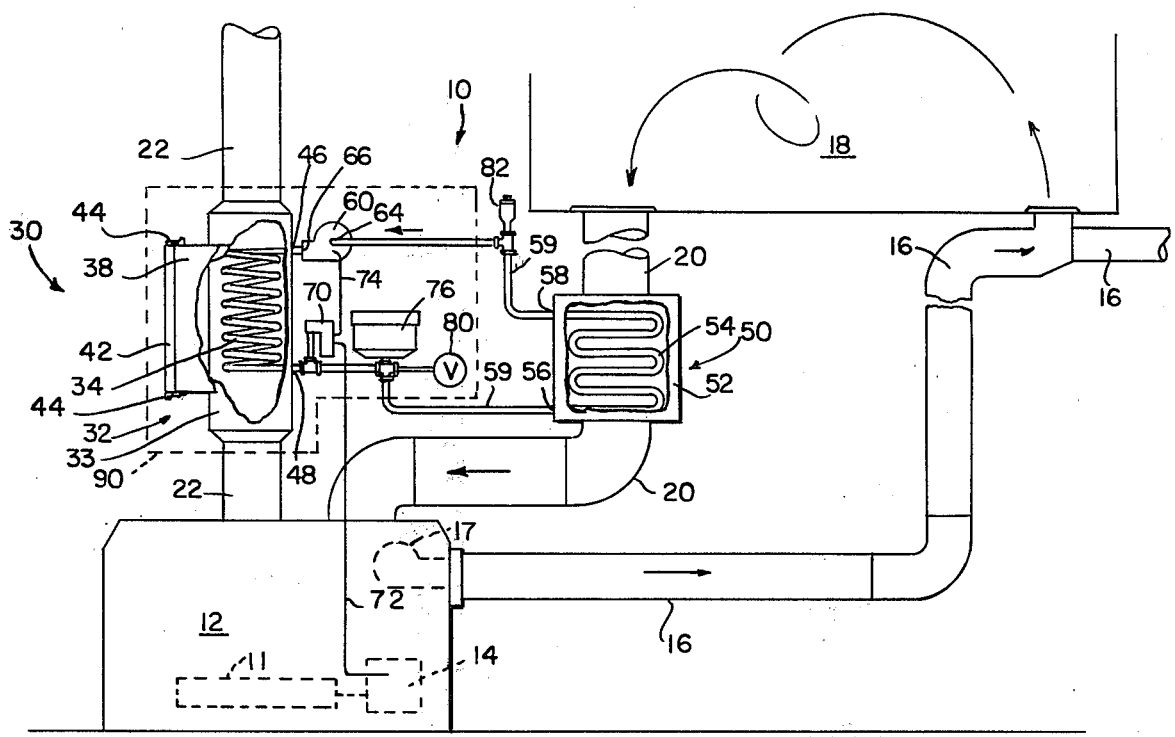
FIG. 1 is a partly sectioned diagrammatic view of a closed-loop heat-reclaiming system according to the present invention shown adapted to a forced-air heating system.

Referring now to FIG. 1, one embodiment of a typical heating system 10 includes a conventional counterflow forced-air furnace 12 which embodies a conventional heat exchanger unit 11 for burning a fuel, such as oil, to heat circulated air. The furnace 12 includes a control system 14 for controlling activation and deactivation of the burners associated with the heat exchanger in accordance with the demand for heat as determined by a thermostat. The furnace 12 also includes a heated air duct 16 and a conventional blower or fan 17 for circulation of the heated air through the duct 16 in the direction represented by the arrows to a room 18 of a building. A cold air duct 20 provides a return path for the air from the room 18 to the furnace 12 which is again circulated through the furnace, heated and forced through the heated air duct 16. Included in the upper portion of the furnace 12 is a chimney flue 22 for exhausting the gases associated with the burning of the fuel. As previously indicated, it is well known that a significant percentage of the heat generated by the furnace 12 is lost through the heated exhaust passing through the chimney flue 22.

Figure 2:
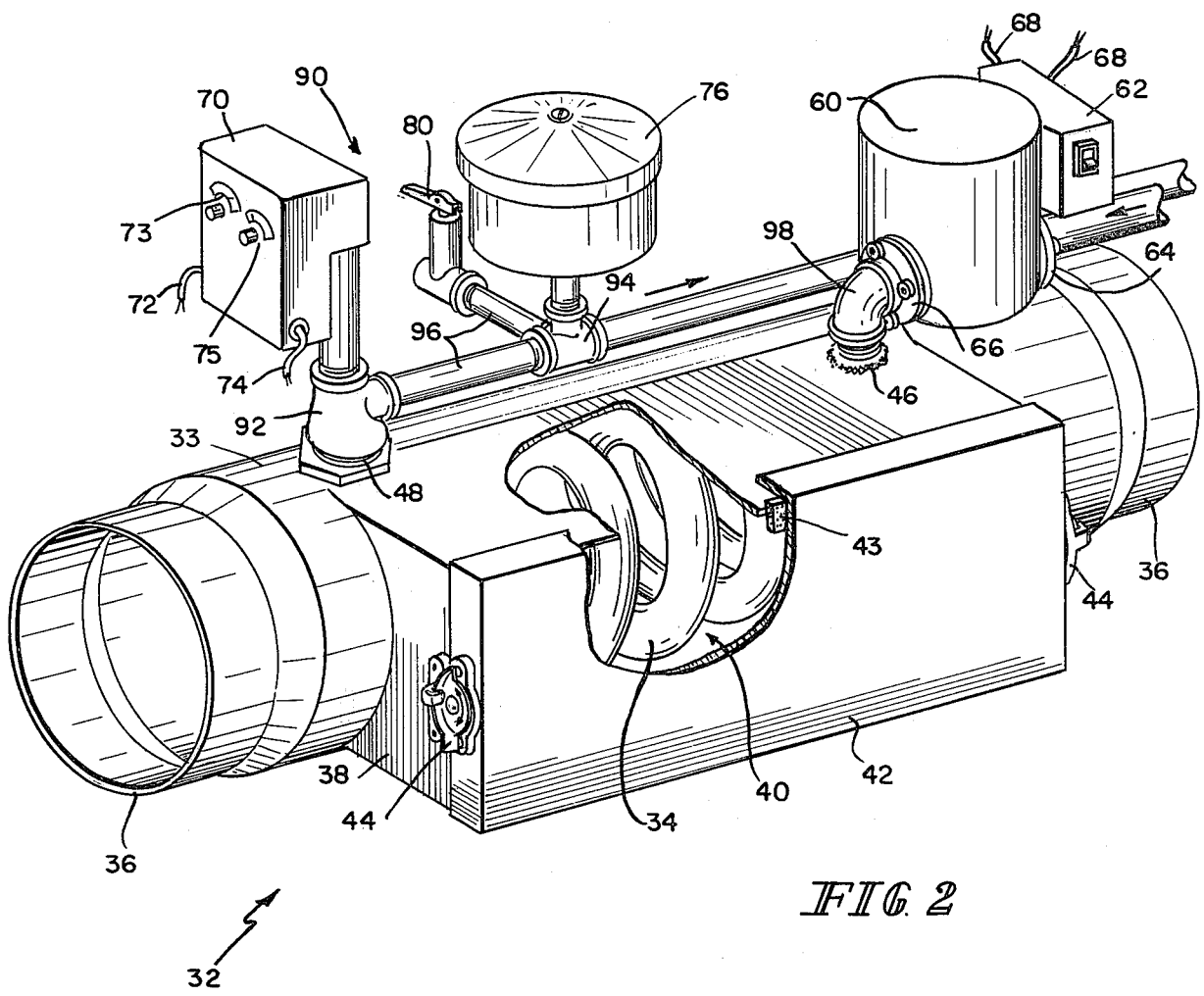
FIG. 2 is a perspective view, partly broken away, of a heat-transfer assembly forming a part of the closed-loop heat-reclaiming system shown in FIG. 1.

Referring now to FIGS. 1 and 2, a heat-transfer system 30, according to the present invention, for reclaiming at least a portion of the heat which is lost through the chimney flue 22 of a heating system 10 includes a first heat exchanger 32 enclosed within an exhaust chamber 33 which is adapted to be positioned in series with the chimney flue 22. Importantly, the exhaust chamber 33 is enlarged and has a cross-sectional inner diameter which is greater than the cross-sectional inner diameter of the chimney flue 22 to house a coil of stainless steel or cooper tubing 34 without obstructing the normal flow of exhaust through the chimney flue 22. The enlarged exhaust chamber 33 housing the first heat exchanger 32 allows a substantially constant flow of heated exhaust to pass through the chimney flue 22 and the exhaust chamber 33, and thereby compensates for the obstruction presented by the first heat exchanger to prevent a back-up of exhaust.

In one illustrative embodiment of the first heat exchanger 32, the coiled tubing 34 is concentrically positioned around the interior of the exhaust chamber 33 and the tubing has an inner cross-sectional diameter of approximately 1 inch (2.54 cm.). It can be appreciated that the tubing 34 may be positioned within the exhaust chamber 33 in other ways in order to absorb the maximum amount of heat from the exhaust of the furnace 12. For example, as illustrated in FIG. 3, the tubing 34 may be coiled twice within the chamber 33 to provide a larger surface for exposure to the heated exhaust.

In operation, a heat-transferring fluid (not shown) such as a solution consisting of 50% water and 50% ethylene glycol having a boiling point of approximately 375° F. (190.56° C.) is circulated through the coiled tubing 34 within the exhaust chamber 33 to absorb heat associated with the heated exhaust of the furnace 12. In one adaptation of the heat-transfer system 30, it has been found advantageous to position a length of coiled tubing 34 within the exhaust chamber 33 so that the heat-transferring fluid reaches a maximum temperature of between 160° F. (71.11° C.) to 180° F. (82.22° C.) as it passes from the inlet to the outlet of the coiled tubing 34.

As can best be seen in FIG. 2, the exhaust chamber 33 includes cylindrical end sections 36 having a reduced outer cross-sectional diameter for connecting the end sections 36 to the chimney flue 22. The exhaust chamber 33 also includes a substantially rectangular intermediate section 38 which provides an opening 40 for gaining access to the interior of the exhaust chamber 33 to clean, service, and maintain the coiled tubing 34 within the exhaust chamber 33. Removably covering the opening 40 is a lid or door 42 including an asbestos seal 43 for sealingly closing the opening 40 during the operation of the furnace 12. Located on the exterior of the lid 42 and the intermediate section 38 are cooperating latches 44 for securing the lid 42 to the opening 40. Also provided in the intermediate section 38 is a fluid inlet opening 46 including means for coupling one end of the coiled tubing 34 thereto and a fluid outlet opening 48 including means for coupling the other end of the coiled tubing 34 thereto.

Continuing to refer to FIGS. 1 and 2, the heat-transfer system 30, according to the present invention, also includes a second heat exchanger 50 remotely located in relationship to the first heat exchanger 32. In the system 30 illustrated in FIG. 1, the second heat exchanger 50 is included within a compartment or chamber 52 which is positioned in series with the cold air return duct 20 of the heating system 10 to preheat the cold air before it is heated by the furnace 12. The second heat exchanger 50 also includes a coil of stainless steel or cooper tubing 54 which again may be positioned concentrically round the interior of the chamber 52 or fashioned in any other manner for dissipating heat to the cold air being returned through duct 20. The coiled tubing 54 and chamber 52 include a fluid inlet opening 56 and a fluid outlet opening 58, each including means for coupling the coiled tubing 54 thereto. As a heated fluid is passed through the coiled tubing 54, heat is dissipated from the tubing 54 and transferred to the cold air being returned to the furnace through the cold air duct 20.

The first heat exchanger 32 and the second heat exchanger 50 are coupled in a closed fluid circulatory loop by conduits 59, illustratively pipe or tubing, with a flow path indicated by the arrows in FIG. 1. As can be seen in FIG. 1, the closed circulatory loop of the heat-transfer system 30 is self-contained within itself and independent of any fluid source. In one illustrative embodiment of the heat-transfer system 30, the closed circulatory loop includes 1½ gallons (5.678 liters) of a heat-transferring fluid, such as the water and ethylene glycol solution described above, and operates normally under 8 pounds of internal pressure. Importantly, because the system 30 is closed and entirely self-contained, mineral deposits associated with the heat-transferring fluid on the interior of the conduit 59 are minimized. Ideally, it has been found that for the system 30 to operate efficiently, there should be at least a 40° F. (4.44° C.) temperature difference between the fluid temperature at the fluid inlet opening 46 and the fluid outlet opening 48 of the first heat exchanger 32.

The closed fluid circulatory loop includes a centrifugal pump 60 located between the fluid inlet opening 46 of the first heat exchanger 32 and the fluid outlet opening 58 of the second heat exchanger 50 for circulating the heat-transferring fluid through the fluid circulatory loop at a preferred flow rate of 18 gallons per minute (68.13 liters per minute). The pump 60 can be operated at variable speeds and includes a variable-speed switch 62, as can best be seen in FIG. 2. The pump 60 further includes a fluid inlet opening 64 and a fluid outlet opening 66, each including means for coupling the openings 64, 66 to conduit 59. Also associated with the pump 60 are leads 68 for connecting the pump 60 to an appropriate power supply source. An example of a particular pump suitable for use in the system 30 is the variable head circulator pump, Model UPS 20-42, manufactured by Grundfos Pumps Corp. of Clovis, Calif. It should be noted that the pump 60 is positioned on the inlet side 46 of the first heat exchanger 32 so that the heat-transferring fluid is forced through the first heat exchanger 32.

The closed fluid circulatory loop also includes a temperature-actuated control 70 positioned within the circulatory loop in proximity to the fluid outlet opening 48 of the first heat exchanger 32 so that it senses temperatures of the fluid which are representative of the maximum temperature of the heated fluid. The temperature-actuated control 70 is a double-action control providing high limit control and low limit control. An example of a particular temperature-actuated control 70 suitable for use in the heat-transfer system 30 is the triple-action control, type 11A61-103, manufactured by White-Rogers, a division of Emerson Electric Company, St. Louis, Mo. This particular control has a high limit temperature range of 100° to 240° F. (38° to 116° C.) and a low limit temperature range of 100° to 240° F. (38° to 116° C.). In one embodiment, the high temperature limit is set at a predetermined value of 200° F. (93.33° C.) and the low limit temperature is set at a predetermined value of 150° F. (65.56° C.). An electrical connection 72 for the high limit control electrically interconnects the temperature-actuated control 70 and the control system 14 of the furnace 12 which controls activation and deactivation of the burner of the furnace 12 so that when the temperature of the heat-transferring fluid exceeds the predetermined temperature of 200° F. (93.33° C.), the temperature-actuated control 70 is activated to de-energize or deactivate the burner of the furnace 12. A gauge 73 provided on the face of the temperature-actuated control 70 provides an indication of the high limit setting. Accordingly, should the temperature of the heat-transferring fluid begin to approximate an undesirable level whereby the fluid may begin to boil and the internal pressure of the closed system begin to increase to a dangerous level, the heat source associated with the furnace 12 is turned off to prevent further heating of the heat-transferring fluid.

A second electrical connection 74 for the low limit control electrically interconnects the temperature-actuated control 70 and the circulating pump 60 so that the circulating pump 60 is only activated if the temperature of the heat-transferring fluid exceeds the predetermined temperature set for the low limit of the temperature-actuated control 70. A gauge 75 is also provided to indicate the low temperature setting. It can therefore be appreciated that the heat-transferring fluid is not circulated through the heat-transfer system 30 until the temperature of the heat-transferring fluid in the first heat exchanger 32 exceeds, for example, 150° F. (65.56° C.), and that the heat source of the furnace 12 is shut off when the heat-transferring fluid temperature exceeds 200° F. (93.33° C.). It should be noted that when the temperature of the heat-transferring fluid exceeds 200° F. (93.33° C.) and the heat source of the furnace 12 is therefore de-energized, the circulating pump 60 continues to operate to circulate the heat-transferring fluid through the closed system 30 to dissipate heat through the second heat exchanger 50 and cool the system 30 as rapidly as possible to prevent an excessive increase of internal pressure within the closed system 30.

Also included in the fluid circulatory loop are safety devices such as a fluid-expansion tank or reservoir 76 having, for example, a 3-gallon (11.355 liter) capacity, a pressure-relief pop-out valve 80 calibrated for 30 pounds of internal pressure, and a filler opening 82 for initially supplying the 1½ gallons (5.678 liters) of heat-transferring fluid to the closed system 30. The filler opening 82 will have a cap for sealingly closing the opening during the operation of system 30. The combination of these various components within the fluid circulatory loop of the heat-transfer system 30 provides safety features for minimizing the risk of dangerous internal pressures of the closed system 30.

Referring particularly now to FIG. 2, a heat-transfer unit or assembly 90 according to the present invention is shown. The assembly 90 integrally includes the first heat exchanger 32, the exhaust chamber 33, the circulating pump 60, the temperature-actuated control 70, the fluid-expansion tank 76, and the pressure-relief pop-off valve 80. As can be seen in FIG. 2, the fluid-control system, including the circulating pump 60, the temperature-actuated control 70, the fluid-expansion tank 60, and the pressure-relief pop-off valve 80, are mounted to the exterior of the exhaust chamber 33 to provide a complete integrated unit which may be easily installed in series with the chimney flue 22 of a heating system 10. By employing one enlarged T-shaped conduit coupling 92, one dual T-shaped conduit coupling 94, two short conduit sections 96 threaded at either end, and one conduit elbow or L section 98, each of the aforementioned fluid-control devices can be supported from the exterior of the exhaust chamber 33. Accordingly, when installing the heat-transfer assembly 90 within the chimney flue 22, only two connections for the conduit 59 need to be made to the assembly 90 to form the closed-loop heat-transfer system 30. Installation of the heat-transfer assembly 90 can therfore be accomplished by relatively unskilled laborers with a minimum of tools and equipment.

Turning now to FIG. 3, the heat-transfer assembly 90, as described hereinabove, is illustratively adapted to another embodiment of a heating system 100 which includes a conventional boiler 102 for providing steam heat to a building (not shown). In the embodiment illustrated in FIG. 3, the heat-transfer assembly 90 adapted to reclaim heat from the exhaust of the boiler system 100 and transfer the heat to a supplementary heating system to heat, for example, a hot water heater, or a room. The boiler system 100 includes a fluid tank 104, a steam inlet and outlet 106, 108, respectively, connected to a series of radiators within the building for heating the building, an intermittently operating burner 110, an exhaust hood positioned over the burner 110, a control system 114 for the burner 110, and a chimney flue 116 connected to the exhaust hood 112. In a boiler heating system 100, such as the one illustrated in FIG. 3, the burner 110 operates independent of the demand for heat, and therefore operates intermittently only to heat the fluid within the tank 104 to produce steam which is circulated through the inlet and outlet 106, 108 to heat the building through a series of radiators located throughout the building. Accordingly, one of the problems heretofore associated with the use of heat-reclaiming systems positioned within the chimney flue 116 of boiler heating systems 100 has been the inability to control the quantity of heat transferred from the first heat exchanger 32 to a remotely located second heat exchanger 124. A closed-loop heat-transfer system 118 according to the present invention solves the problem of controlling the quantity of heat transferred from the first heat exchanger 32 to a remotely located supplementary heating unit 120 such as a water heater, or heating source, or an extra room.

The heating unit 120 may include a fluid outlet opening 121 and a fluid inlet opening 122 for circulating a fluid which is heated within the unit 120 through, for example, a radiator 123 to heat a room in a building.

The closed-loop heat-transfer system 118 includes the heat-transfer assembly 90, described above, positioned in series with the chimney flue 116 of the boiler 102. The heat-transfer assembly 90 shown in FIG. 3 includes each of the elements previously described, and therefore those elements have been identified by the same reference numerals. As illustrated in FIG. 3, the two leads 68 of the circulator pump 60 are connected directly to a power supply source (+ and −) so that the circulator pump 60 is controlled independent of the heat-transfer assembly 90. Accordingly, the circulator pump 60 will operate continuously notwithstanding the temperature of the heat-transferring fluid within the closed-loop system 118. Furthermore, the electrical connection 74 of the temperature-actuated control 70 associated with the lower limit setting is connected to a means for controlling the flow path of the heated exhaust through the chimney flue 116 to control the quantity of heat being transferred from the first heat exchanger 32 to a remotely located second heat exchanger 124 in a manner to be described later.

Continuing to refer to FIG. 3, the closed-loop heat-transfer system 118 further includes a second heat exchanger 124 positioned within the supplementary heating unit 120. The second heat exchanger 124 may include a hollow core member 126 having a fluid inlet opening 128 and a fluid outlet opening 130 for coupling the second heat exchanger to the first heat exchanger 32 by conduits 59 to form the closed-loop system 118. The core 126 may have a plurality of coils or fins 132 positioned around its exterior to facilitate the dissipation of heat from the heat-transferring fluid. It should be understood that while one embodiment of the second heat exchanger 124 has been illustrated in FIG. 3, it is not intended that the present invention necessarily be limited to that particular configuration of a second heat exchanger 124.

As can be seen in FIG. 3, when the heat-transfer assembly 90 is positioned in series with the chimney flue 116 of the boiler 102, the exhaust chamber 33 includes an exhaust inlet end 136 and an exhaust outlet end 138. According to the present invention, the closed-loop heat-transfer system 118 includes a bypass duct 140 connecting the chimney flue 116 in proximity to the exhaust inlet 136 of the exhaust chamber 33 to the chimney flue 116 in proximity to the exhaust outlet 138 of the exhaust chamber 33. Positioned within the chimney flue 116 in proximity to the exhaust inlet end 136 of the chamber 33 is a motor-controlled damper 142 having a first position blocking the flow of exhaust through the bypass duct 140, and thereby allowing the exhaust to pass through the first heat exchanger 32 and a second position blocking the chimney flue 116 to the exclusion of the first heat exchanger 32, thereby allowing the exhaust to flow through the bypass duct 140. A motor 144 associated with the damper 142 includes an electrical connection 146 for connecting the motor 144 to the lower limit of the temperature-actuated control 70 (electrical connection 74) of the heat-transfer assembly 90. The lower limit setting of the temperature-actuated control 70 will be determined by the quantity of heat desired to be transferred from the first heat exchanger 32 to the second heat exchanger 124. However, the lower limit setting should be less than the high limit setting of, for example, 200° F. (93.33° C.). As the temperature of the heat-transferring fluid exceeds the predetermined lower limit setting, the temperature-actuated control 70 will activate motor 144, moving the damper 142 to its second position blocking the flow of exhaust through the first heat exchanger 32 to prevent further heating of the heat-transferring fluid. In this mode of operation, the flow path of the exhaust is routed through the bypass duct 140 to the exclusion of the first heat exchanger 32.

Turning now to FIG. 4, a further embodiment of a heating system 150 for heating large commercial buildings (not shown) includes a large boiler system 152, including a fluid tank 154 and a burner 156 which heats the fluid within the tank 154 to produce steam which is carried to a plurality of radiators (not shown) appropriately positioned throughout the building. Associated with these larger boiler systems 152 is a substantially larger exhaust system 158, including a chimney flue 160 interconnecting the boiler 152 to a chimney stack 162.

According to the present invention, a closed-loop heat-transfer system 170 includes a first heat exchanger 172 of substantially larger magnitude than heretofore described which is contained within an exhaust chamber 174 positioned in series with the chimney flue 160 of the heating system 150. The first heat exchanger 172 includes a large coil of stainless steel or copper tubing supported within the exhaust chamber 174 in spaced relationship to the inner surface of the chamber 174 by a coil support 178. The coil support 178 includes a plurality of radially inwardly projecting legs 180 which are equally spaced. Connected to the radially inner portion of each of the legs 180 is a U-shaped clamp for capturing and holding the coiled tubing 176 in spaced relationship to the interior surface of the chamber 174.

As can be seen in FIG. 4, the exhaust chamber 174 is elevated in proximity to the chimney stack 162 so that the heated exhaust rises through the chimney flue 160 and flows up the chimney stack 162. A drain 184 is provided to remove moisture from the exhaust chamber 174 formed as a result of condensation on the coiled tubing 176.

The exhaust chamber 174 includes a removable hood or door 186 for allowing access to the exhaust chamber 174 to service, clean, and maintain the coiled tubing 176. The hood 186 is provided with latches 187 for sealing the exhaust chamber 174 during the operation of the heating system 150. The exhaust chamber 174 also includes a first fluid opening 188 and a second fluid opening 190 providing means for connecting the first heat exchanger 172 to a second heat exchanger 192 to form a closed-loop heat-transfer system 170 according to the present invention. As illustrated by the broken lines in FIG. 4, the closed-loop heat-transfer system 170 may include a circulating pump 194 and fluid safety controls 196 of the type previously described.

What is claimed is:

1. In a forced-air heating system which includes means for burning fuel to heat air, means for circulating air in proximity to the fuel-burning means to transfer heat therefrom to the air and for circulating the heated air through a heated air duct, a cold-air return duct, a chimney flue for venting gases produced by the burning fuel, and a control system for energizing the fuel-burning means in response to a demand for heat, and for de-energizing the fuel-burning means when the demand is met, the improvement comprising a closed-loop heat-transfer apparatus for reclaiming heat from gases in the chimney flue of the heating system, the heat-transfer apparatus including a first heat-exchanger chamber positioned in series with the chimney flue, the first chamber including a fluid inlet opening and a fluid outlet opening, a coiled conduit positioned interior to the chamber, the conduit having one end connected to the fluid inlet opening and another end connected to the fluid outlet opening, means allowing access to the interior of the first chamber for cleaning and servicing, a second heat-exchanger chamber positioned in series with the cold-air duct, the second chamber including a fluid inlet opening and a fluid outlet opening, means coupling the fluid openings of the first and second chambers to form a closed circulatory loop, a predetermined quantity of heat-transferring fluid contained in the loop, means for circulating the predetermined quantity of fluid through the loop between the first and second chambers to heat the quantity of fluid, transfer the heat therefrom to the cold air in the return duct, and reheat the same quantity of fluid, a temperature-actuated control coupled in the loop in proximity to the fluid outlet opening of the first heat-exchanger chamber to sense maximum temperatures of the fluid, the temperature-actuated control including a high limit control and a low limit control, means electrically connecting the low limit control to the fluid circulating means, the fluid circulating means being activated when the maximum temperature of the fluid exceeds a first predetermined temperature, and means electrically connecting the high limit control to the control system for activating and deactivating the fuel-burning means, heat production by the fuel-burning means being reduced when the maximum temperature of the fluid reaches a second predetermined temperature.

2. The apparatus as recited in claim 1 wherein the first heat-exchanger chamber has a cross-sectional dimension which is greater than the cross-sectional dimension of the chimney flue to permit a generally constant flow rate of exhaust through the chimney flue and chamber.

3. The assembly as recited in claim 2 wherein the second predetermined temperature is greater than the first predetermined temperature.

4. The assembly as recited in claim 3 wherein the fluid control system further includes a pressure-relief valve and a fluid-expansion tank.

5. In a forced-air heating system which includes means for burning fuel to heat air, means for circulating air in proximity to the fuel-burning means to transfer heat therefrom to the air and for circulating the heated air through a heated air duct, a cold-air return duct, a chimney flue for venting gases produced by the burning fuel, and a control system for energizing the fuel-burning means in response to a demand for heat, and for de-energizing the fuel-burning means when the demand is met, the improvement comprising a closed-loop heat-transfer system, the heat-transfer system including in combination: an exhaust chamber coupled in series with the chimney flue of the heating system, the exhaust chamber having exhaust inlet and outlet openings connected to the chimney flue, the exhaust chamber including a first heat exchanger having a fluid inlet opening and a fluid outlet opening, a second heat exchanger positioned in the cold-air return duct, the second heat exchanger having a fluid inlet opening and a fluid outlet opening, conduit means for coupling the fluid openings of the first heat exchanger to the fluid openings of the second heat exchanger to form a closed circulatory loop for a heat-transferring fluid, the closed fluid circulatory loop including means for circulating the fluid therethrough and a temperature-actuated control responsive to the fluid temperature, the temperature-actuated control being coupled in the loop in proximity to the fluid outlet opening of the first heat exchanger to sense maximum temperatures of the fluid, means electrically interconnecting the temperature-actuated control and the fluid circulating means, the temperature-actuated control activating the circulating means when the fluid temperature exceeds a first predetermined temperature, and means electrically interconnecting the temperature-actuated control and the control system of the heating system, the temperature-actuated control deactivating the control system to de-energize the fuel-burning means when the fluid temperature exceeds a second predetermined temperature.

6. The system as recited in claim 5 wherein the first predetermined temperature is less than the second predetermined temperature.

7. The system as recited in claim 6 wherein the closed fluid circulatory loop further includes a fluid-expansion reservoir and a pressure-relief valve.

8. In a forced-air heating system which includes means for burning fuel to heat air, means for circulating air in proximity to the fuel-burning means to transfer heat therefrom to the air and for circulating the heated air through a heated air duct, a cold air-return duct, a chimney flue for venting gases produced by the burning fuel, and a control system for energizing the fuel-burning means in response to a demand for heat, and for de-energizing the fuel-burning means when the demand is met, the improvement comprising a closed-loop system for transferring heat from the gases in the chimney flue to the air being returned through the cold air duct, the system including a first heat exchanger coupled in series with the chimney flue, the first heat exchanger having a fluid inlet opening and a fluid outlet opening, a second heat exchanger coupled in series with the cold air duct, the second heat exchanger having a fluid inlet opening and a fluid outlet opening, conduit means coupling the fluid outlet opening of the first heat exchanger to the fluid inlet opening of the second heat exchanger and the fluid outlet opening of the second heat exchanger to the fluid inlet opening of the first heat exchanger, thereby to form a closed self-contained circulatory loop, a predetermined quantity of a heat-transferring fluid contained within the closed loop, means for circulating the predetermined quantity of fluid through the loop, a temperature-actuated control coupled in the loop in proximity to the fluid outlet opening of the first exchanger to sense maximum temperatures of the fluid, the temperature-actuated control including a high limit control and a low limit control, means electrically connecting the low limit control to the fluid circulating means, the fluid circulating means being activated when the maximum temperature of the fluid exceeds a predetermined low temperature, and means electrically connecting the high limit control to the control system for activating and deactivating the fuel-burning means, heat production by the fuel-burning means being reduced when the maximum temperature of the fluid reaches a predetermined high limit temperature.

9. The system as recited in claim 7, further comprising means for allowing access to the interior of the exhaust chamber to clean and service the first heat exchanger without disconnecting the exhaust chamber from the chimney flue.

* * * * *